US006962291B2

(12) United States Patent
Guntveit et al.

(10) Patent No.: US 6,962,291 B2
(45) Date of Patent: Nov. 8, 2005

(54) DEVICE FOR AUTOMATICALLY RECEIVING, SCANNING AND HANDLING CONTAINERS

(75) Inventors: Lars Guntveit, Vollen (NO); Hans Ulrik Rustad, Stavern (NO); Niels Erik Andersen, Vollen (NO)

(73) Assignee: Repant AS, Drammen (NO)

( * ) Notice: Subject to any disclaimer, the term of this patent is extended or adjusted under 35 U.S.C. 154(b) by 106 days.

(21) Appl. No.: 10/398,258

(22) PCT Filed: Sep. 20, 2001

(86) PCT No.: PCT/NO01/00382

§ 371 (c)(1),
(2), (4) Date: Aug. 6, 2003

(87) PCT Pub. No.: WO02/28554

PCT Pub. Date: Apr. 11, 2002

(65) Prior Publication Data

US 2004/0046028 A1 Mar. 11, 2004

(30) Foreign Application Priority Data

Oct. 3, 2000 (NO) .......................................... 20004989

(51) Int. Cl.[7] .................................................. G06K 7/10
(52) U.S. Cl. .................................................. 235/462.14
(58) Field of Search ....................... 235/462.14, 462.01, 235/459; 700/223–230; 198/379–382, 397.04, 397.05, 397.06

(56) References Cited

U.S. PATENT DOCUMENTS

| | | | | |
|---|---|---|---|---|
| 4,967,070 A | * | 10/1990 | Ringlien et al. | 250/223 B |
| 5,161,661 A | | 11/1992 | Hammond | |
| 5,257,741 A | | 11/1993 | Rode et al. | |
| 5,361,913 A | * | 11/1994 | Melchionna | 209/583 |
| 5,630,493 A | | 5/1997 | DeWoolfson et al. | |
| 5,730,276 A | * | 3/1998 | Itoh | 198/465.1 |
| 5,895,911 A | * | 4/1999 | Giometti et al. | 250/223 B |
| 5,898,169 A | | 4/1999 | Nordbryhn | |
| 5,934,440 A | * | 8/1999 | Kroghrud | 194/212 |
| 6,012,588 A | | 1/2000 | Steidel et al. | |
| 6,199,679 B1 | * | 3/2001 | Heuft | 198/415 |
| 6,260,425 B1 | * | 7/2001 | Eder | 73/865.8 |
| 6,447,134 B1 | * | 9/2002 | Takahashi et al. | 362/31 |
| 6,678,578 B2 | * | 1/2004 | Holmen et al. | 700/223 |
| 2003/0161714 A1 | * | 8/2003 | Blattner et al. | 414/935 |

FOREIGN PATENT DOCUMENTS

| | | |
|---|---|---|
| NO | 302739 | 4/1998 |
| SE | 508 326 | 9/1998 |

* cited by examiner

*Primary Examiner*—Thien M. Le
*Assistant Examiner*—Edwyn Labaze
(74) *Attorney, Agent, or Firm*—Andrus, Sceales, Starke & Sawall, LLP

(57) ABSTRACT

A device in equipment for automatically receiving, scanning and handling containers (41) which are essentially rotationally symmetrical about their longitudinal axes, e.g. bottles or cans of any suitable type of material, the equipment being arranged in such a way that the containers are conveyed and/or rotated in a lying position, by means of a conveyor (30), through a recognizing chamber (10) past at least two detectors for scanning information on the properties of the container (41), from where the scanned information is transferred to a control unit, which decides the conveying path downstream and further handling of the container (41), the conveyor (30) being arranged in such a way that the container (41) is forced at an angle against a supporting device (40), whereby the container (41) is simultaneously carried along and rotated about its own longitudinal axis in a helical movement; the device being provided with an image processing system (60) comprising a camera which is arranged, in cooperation with backlighting from a light plate (50), to recognize the appearance of the container (41), a bar code reader (70) being arranged to scan essentially simultaneously a bar code located on the container (41), the helical motion of the container (41) being such that in one turn of the container a complete bar code will be readable to the bar code reader (70).

7 Claims, 4 Drawing Sheets

DEVICE FOR AUTOMATICALLY RECEIVING, SCANNING AND HANDLING CONTAINERS

CROSS REFERENCE TO RELATED APPLICATION

The present application is the U.S. national stage application of International Application PCT/NO01/00382, filed Sep. 20, 2001, which international application was published on Apr. 11, 2002 as International Publication WO 02/28554. The International Application claims priority of Norwegian Patent Application 20004989, filed Oct. 3, 2000.

SUMMARY OF THE INVENTION

The present invention relates to a device in equipment for automatically receiving, scanning and handling containers which are essentially rotationally symmetrical about their longitudinal axes, e.g. bottles or cans of any suitable type of material. In the following the device according to the invention is referred to as "the device".

Devices for automatically receiving, scanning and handling used containers for beverages, as described above, must be able to recognize a number of the characteristic properties of the containers. This is necessary in order to accept, sort and further handle the containers and to pay back the correct return value to the person who is returning the containers.

The device must be arranged to recognize at least one of the characterizing properties of the container, which may be for example: its appearance, typically by shape and color, bar code or other identifier, weight and/or type of material.

Because the containers to be identified are rotationally symmetrical about their longitudinal axes, properties like shape, color, weight and type of material may easily be identified by viewing the container from any side relative to the longitudinal axis of the container. Identifiers such as bar code are most often visible only from one side of the container and therefore requires that the container is rotated for reliable scanning of the identifier.

It is important that this type of device has a quick receiving, recognizing and processing rate, so that the user may deliver the containers at a natural speed and does not have to wait for the device to identify the container.

Devices for automatically receiving, scanning and handling used containers for beverages, which are able to scan properties as described above, are known i.a. from Norwegian patent NO-A-971888. From this patent it is known to use two separate devices to scan all the properties of the container. The first device carries the container past an image processing system, where, e.g., the shape and color of the container may be scanned. In the same device as that where the image processing system is placed, there may also be arranged weighing scales, a metal detector and other sensors which do not depend on rotation of the container. The second device consists of a combined conveyor, which makes it possible to carry the container into and out of a scanning area defined by a bar code reader, and rotating rollers which make it possible to scan a bar code which is found only on one of the sides of the container.

Other patents and publications, such as U.S. Pat. No. 5,257,741, SE-C-508.326 and U.S. Pat. No. 5,898,169, describe devices which can recognize some, but not all, of the properties described above.

Devices as described above are slow, technically complex, require much space and are badly suited for recognizing packaging which is characterized by a combination of several or all of the characteristic properties described above. Known technique relies on a great number of actuators and movable parts, which again results in high production and maintenance costs.

In the device described in NO-A-971888 there are a great number of actuators, such as motors, to activate the mechanisms of the system. The number of movements that the actuators must make to complete a recognizing sequence, is very large. This results in the recognizing rate being limited by how fast the actuators may run through their sequences. The limitations in the recognizing rate results in the fact that users of the device must wait unnecessarily long to deliver their containers and have them processed. Quick and efficient reception and processing of containers are some of the most important properties in reverse vending machines.

In particular, the combination of simultaneous scanning of form and bar code has been difficult. These two properties are often considered to be the most distinct ones for correct identification of a container. Other properties such as color, weight and type of material are often considered as properties confirming or invalidating a recognition made by means of shape and/or bar code.

Especially the combination of the abilities to recognize both disposable packaging and reuse packaging in one and the same device is difficult by means of known technique. In disposable packaging the bar code is the main property that must be scanned for approval. The shape, which is often not known exactly, must be recognized to verify the approval. In reuse packaging the shape is the main property which must be detected for approval, whereas the bar code, which is not always present, may be used to verify the approval.

Known technique as described above, which does not make use of an image processing system in addition to bar code scanning, often behaves as a blind system, which is not able to "see" what is happening in the device. Thereby, the device will not be able to observe the position and direction of the container, nor to identify possible situations of error. Without an image processing system it will be difficult for a device of this kind to coordinate the carrying of the container and the control of other sensors, such as for example bar code reader, scales and material detector. Lack of an image processing system often results in low recognizing rate because the feed opening of the device must be physically blocked between recognition of each individual container in order to prevent the user from feeding containers faster than what the device can handle. As earlier mentioned, quick and efficient reception, and processing, of the containers are some of the most important properties of recognizing chambers.

DETAILED DESCRIPTION OF THE INVENTION

The object of the invention is to provide a device which may fast, simply and efficiently recognize a container which is rotationally symmetrical about its longitudinal axis, by scanning one or more of the following properties: appearance, bar code, weight and type of material. The recognition is performed by one integral device, in which the above drawbacks of known equipment have been remedied.

The device according to the invention is characterized by the features described below. A conveyor is sloping somewhat relative to the horizontal plane and relative to the feeding direction perpendicular in the horizontal plane. Gravity together with the motion of the belt presses a container against a supporting device parallel to the conveying direction, and thereby effects simultaneous conveyance and rotation of the container. The angle between the conveyor and supporting device is arranged in such a way that the container rotates at least 360 degrees within the scanning area of a bar code reader system.

One side of the device is provided with a translucent illuminated or fluorescent plate which is arranged to form backlighting for the container.

The supporting device, e.g. a plate or arm, towards which the container glides and rotates, defines the direction of conveyance of the container without blocking an essential part of the backlighting seen from an image processing system. If the supporting device is formed by a plate, the plate may at the same time form backlighting as described above.

The image processing system makes use of, i.a., differentiated recognition in that a background picture is deducted from a foreground picture. The camera of the image processing system is so placed that the field of view of the system is flush with the surface of the conveyor, thereby having the effect that the conveyor essentially will not block the backlighting.

The device is provided with a bare code reader system or some other kind of identifier scanning system. Such systems may be an integrated part of the image processing system.

A control unit electrically and/or electronically processes the data and signals communicated by the detectors, and on the basis thereof determines the identity of the container. The control unit uses the identity of the container to decide the further conveyance and processing of the container. If the container cannot be identified, the conveyor is reversed, thereby returning the container out of the device.

BRIEF DESCRIPTION OF THE DRAWINGS

In the following will be described a non-limiting example of a preferred embodiment, which is visualized in the accompanying drawings, in which.

DETAILED DESCRIPTION OF THE DRAWINGS

Figure 1:
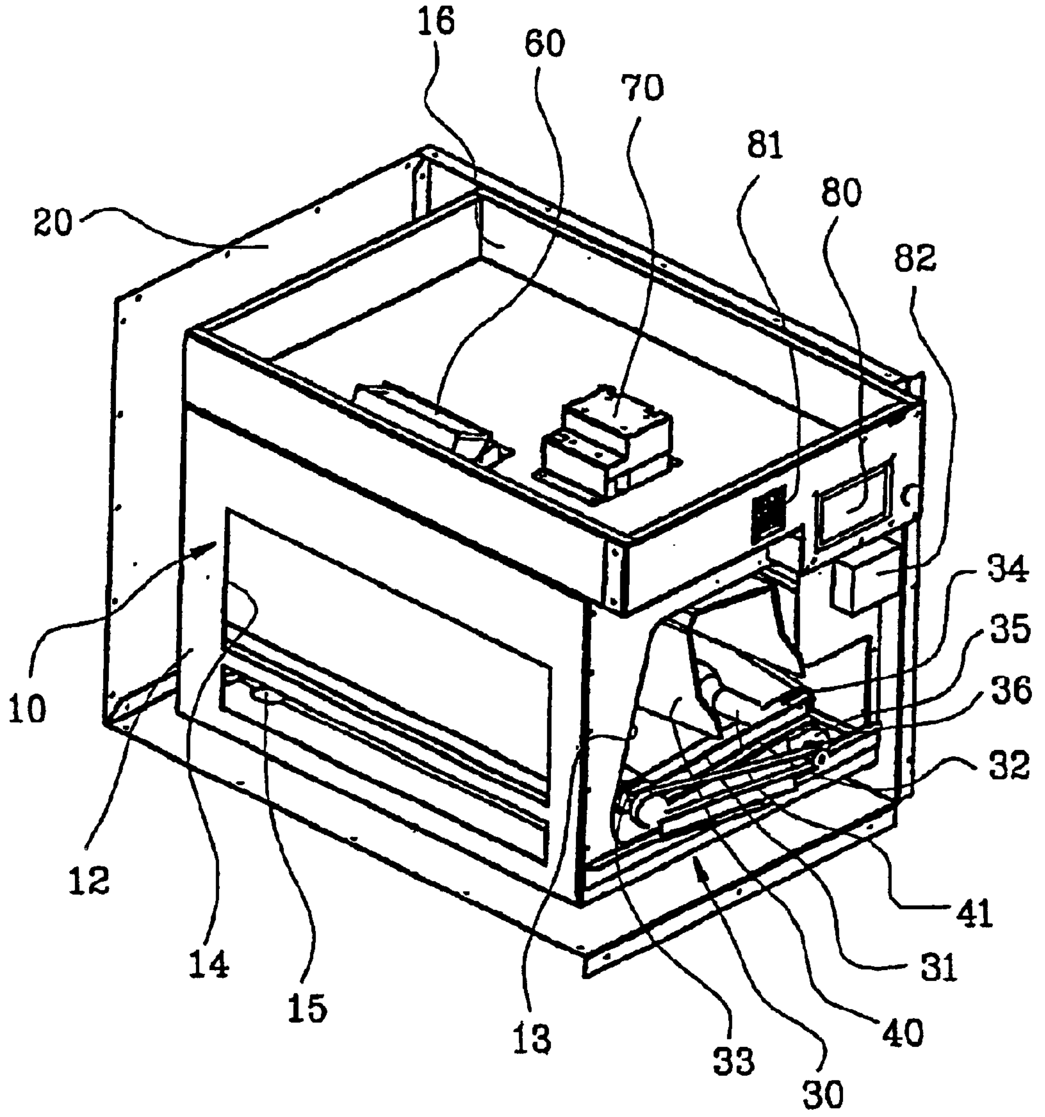
FIG. 1 shows in perspective the recognizing device fitted in a so-called recognizing chamber, the recognizing chamber being arranged in a partially uncovered outer chamber which may in its turn be part of a reverse vending machine.

In the drawings the reference numeral 10 identifies a recognizing chamber comprising a case-like construction 12 with a feed opening 13, an outlet opening, not shown, on the opposite side, an access opening 14 and a drain opening 15. The upper part 16 of the recognizing chamber forms a closed space, in which electric and electronic equipment may be fitted. In FIG. 1 the space 16 is shown without a lid. The recognizing chamber 10, which is displaceably located within an outer chamber 20 in its operative position, is provided with a conveyor 30, a supporting device 40 for containers 41, a light plate 50, a mirror 56, an image processing system 60, a bar code reader 70 and moreover necessary communication devices for a control system, not shown, such as a display screen 80, a key-board 81 and a printer 82.

The conveyor 30 comprises a separate frame 31, a belt 32 which is suspended between a driving roller 33 and a turning roller 34, and which is driven by an electric motor 35 by way of a belt transmission 36. The conveyor 30 is sloping somewhat relative to the horizontal plane, possibly by way of weighing scales connected to a case-like structure 12. A material detector not shown, e.g. a metal detector, may be provided in connection with the conveyor 30. In the drawings the supporting device 40 is shown as a tunnel formed by a feeding plate 42, which is essentially perpendicular relative to the conveyor 30 and arranged to guide the container 41 during the conveying, and a returning plate 43, which is essentially parallel to the feeding plate 42 and arranged to guide the container 41 during the returning thereof. A ceiling element 44 connects the supporting plates 42 and 43 to each other. The supporting device 40 is fixedly connected to the separate frame 31 of the conveyor 30, so that frictional forces between the container 41, supporting plates 42,43, and belt 32 do not affect a possible weighing device. The supporting device 40 is placed at a defined smaller angle relative to the moving direction of the conveyor belt 32, see FIG. 3. This results in, when the conveyor 30 is operative, the container simultaneously being fed forward and rotated about its longitudinal axis. The supporting device 40 which is formed of a transparent material is formed, in this preferred embodiment, as a tunnel to achieve good rigidity and at the same time protect the internal components of the recognizing chamber 10 against inadvertent contact from e.g. crookedly fed containers 41.

The translucent illuminated, possibly fluorescent, light plate 50 is positioned at one side of the recognizing chamber 10 and arranged to form backlighting for the container 41. A mirror 56 is placed at the opposite internal side of the recognizing chamber 10.

As mentioned above, the plates 42 and 43 are so formed that they do not disturb, to any degree worth mentioning, the light from the light plate 50 relative to the image processing system 60. The image processing system 60, which comprises a camera and associated image analysing electronics, is arranged, together with the backlighting from the light plate 50 and the mirror 56, to determine the optical properties of the container 41, e.g. profile and color. The image processing system 60 utilizing i.a. a differentiated image may be used together with image processing technology known in itself, to determine dimensions, area, center of gravity point and other properties of recognizable parts of the container. The bar code reader system 70 is placed in such a way that it “looks” down towards the conveyor 30. The bar code reader system 70 is arranged to read a possible bar code which may easily identify the kind of the packaging.

Whenever necessary, the recognizing chamber 10 may be provided with other detectors than those mentioned above. Information from the detectors and image processing system 60 may be directed collectively or in pieces to a central control unit, not shown, in which the processing requirements, return value and similar of the container 41 are determined.

The recognizing chamber 10 is particularly useful as part of a reverse vending machine, by which the users may return used beverage containers against return of the deposit paid. The users may insert containers through the feed opening 13 by laying the containers on the conveyor 30. Approved containers will be conveyed downstream through the outlet opening, not shown, for further sorting, processing and storing. Rejected containers may be returned through the feed opening 13. The users may have a receipt printed on the printer 82 for approved containers by depressing an operating switch, not shown. Information to the user may be communicated on the display screen 80. Such information may concern number of containers, return value and instructions on the use of the reverse vending machine. An acoustic signal device, not shown, may be used to attract the user's attention. Other operating means, e.g. a card reader or coin dispenser, may be fitted as required. Skilled personnel may configure the reverse vending machine and carry out maintenance by means of the key-board 81, display screen 80 and printer 82.

Figure 2:
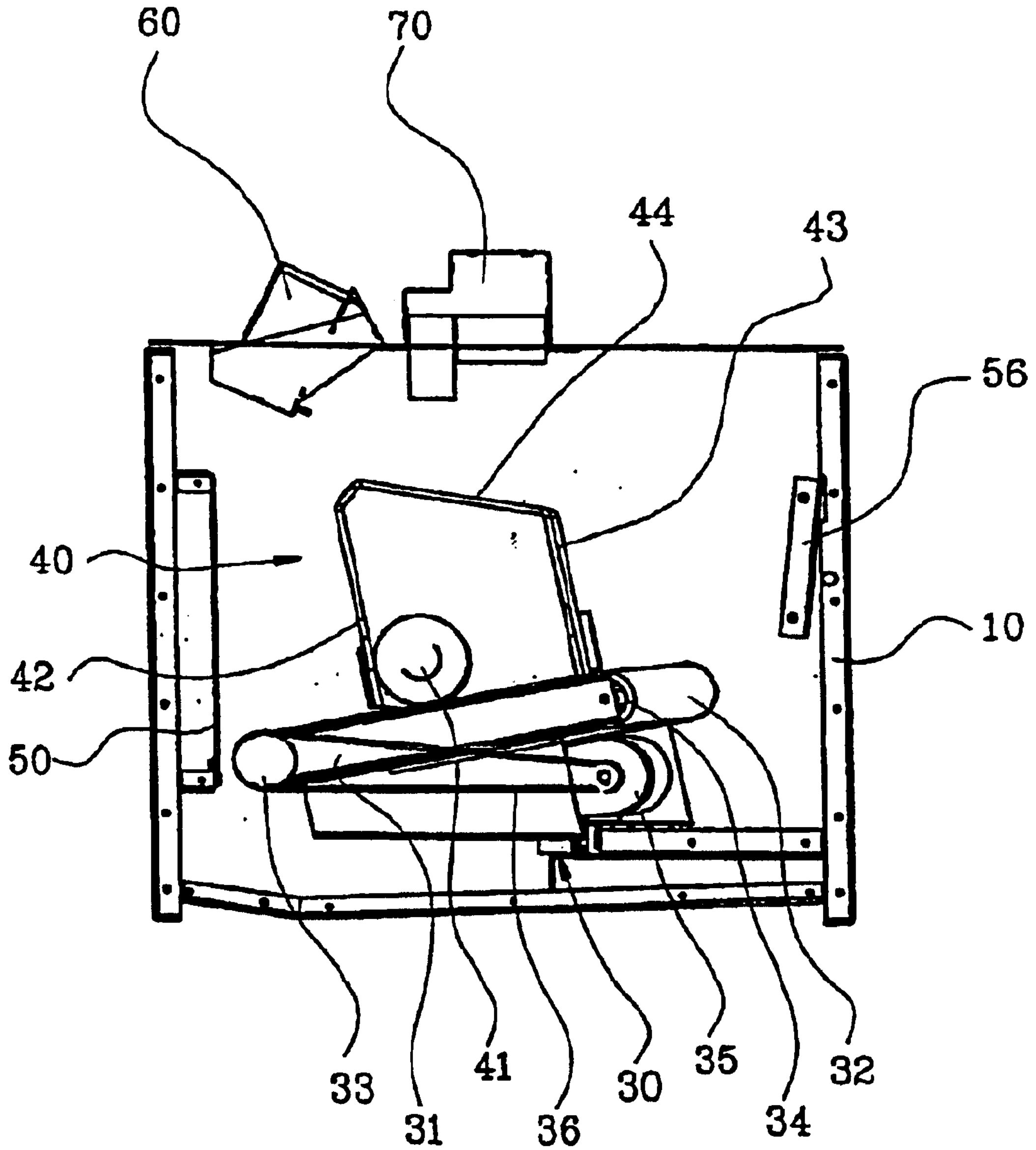
FIG. 2 shows the recognizing-chamber in a front view.

The camera of the image processing system 60 "looks" towards the backlighting of the light plate 50 by way of the mirror 56, so that the distance to the container 41 is the longest possible one. Thereby unnecessary distortion of the image through a wide-angle lens in the camera of the image processing system 60 is avoided. The mirror 56 is so placed that the viewing angle of the image processing system 60 is flush with the angle β, see FIG. 2, of the conveyor 30, and this is to prevent the surface of the conveyor 30 from being visible in the camera image. The plates 42 and 43 are transparent in such a way that they do not disturb, to any degree worth mentioning, the camera recording of the image processing system 60 of the backlighting from the light plate 50 and a possible container 41. A bar code reader system 70 of a kind known in itself is placed above the conveyor 30, so that undisturbed scanning of the container 41 passing along the plates 42, 43 is achieved.

Figure 3:
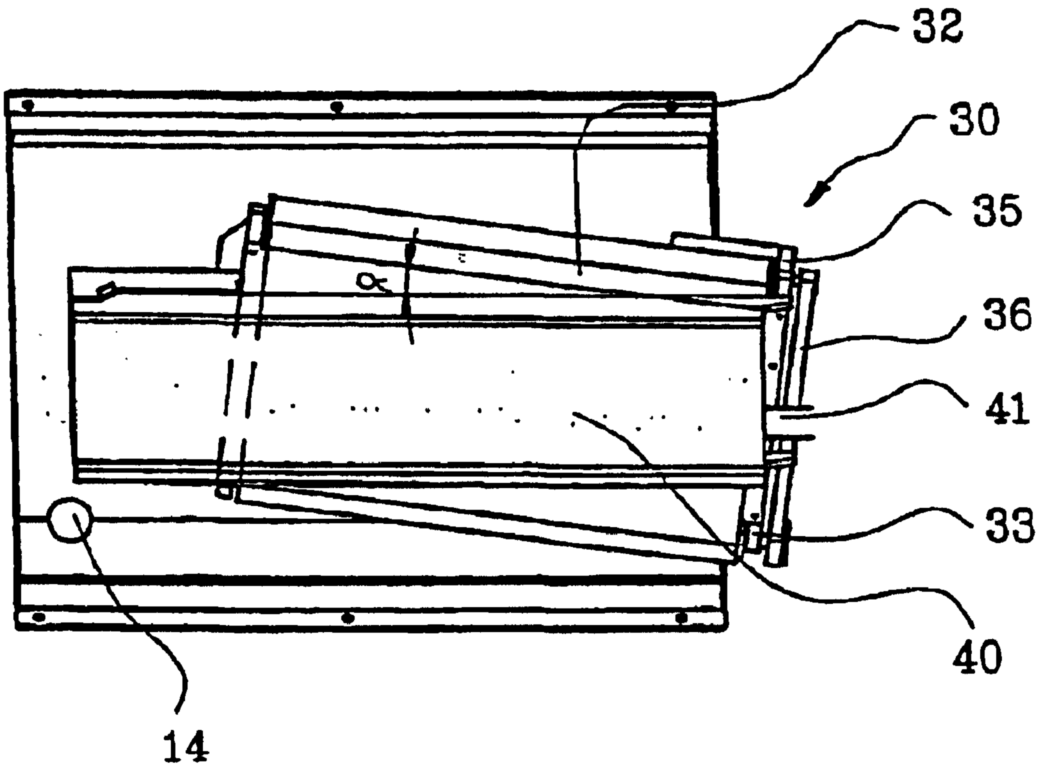
FIG. 3 shows in partial section the recognizing chamber in a top plan view.
Figure 4:
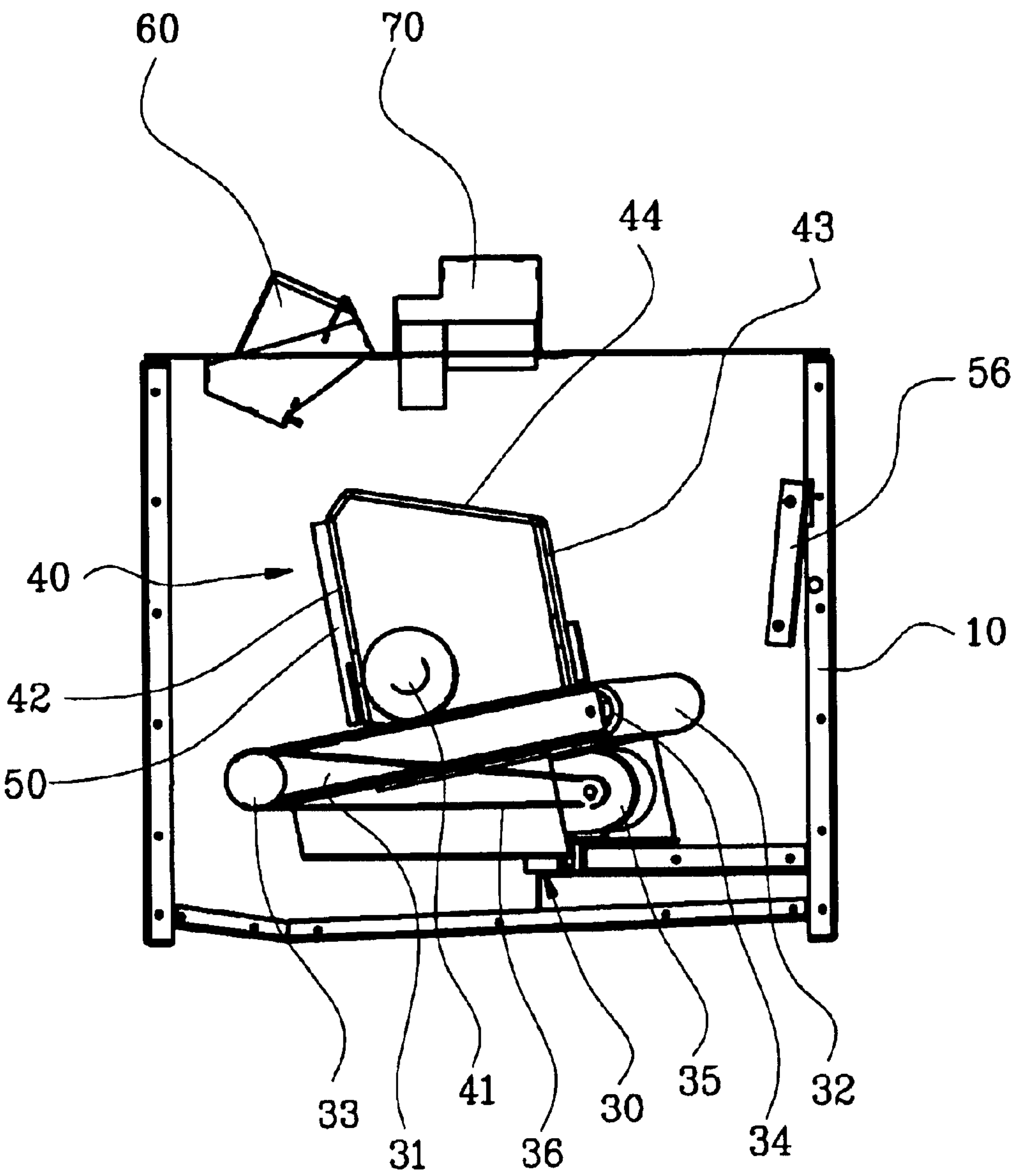
FIG. 4 shows the recognizing chamber in a front view and depicts the light plate arranged as part of the support device.

The angle α of the conveyor 30 relative to the plates 42, 43, see FIG. 3, makes the container 41 be carried in a helical motion in that the container 41 is forced against the plate 42 when the conveyor 30 is run in the feeding direction. The angle α is determined by the ratio of the largest circumference of a container 41 and the length of the reading area of the bar code reader 70, so that the container 41 is rotated at least 360 degrees within the reading area of the bar code reader 70. This gives:

$$\alpha\ \sin^{-1}(l_1/(2\times\pi\times r+l_2)),$$

in which r equals the radius of the container, $l_1$ is the length of the reading area of the bar code reader system 70 and $l_2$ is the length of a bar code which is perpendicular to the axis of rotation of the container (i.e. the symbol bars are parallel to the surface generators of the container, so-called "fence" positioning of the bar code). The angle α implies that a container will be carried into the recognizing chamber 10 at the speed $v_1=v_2\times\sin(\alpha)$, in which $v_2$ is the speed of the conveyor 30.

A possible weighing scales system may be used to verify that the weight of the container 41 is within defined frames and that the container 41 does not contain undesired amounts of liquid. A possible metal detector may be used to determine the type of material of the container, e.g. steel or aluminium.

As the container 41 is being carried forward through the recognizing chamber 10 information on the container 41 is gathered by the sensors and transferred in real time within the control unit of the recognizing chamber 10. The container 41 will change the intensity of the light as seen by the camera where the container 41 blocks the light. If the container 41 is of a transparent material, e.g. clear glass or plastic, the light intensity may be both increased and reduced due to the container 41. Therefore the camera of the image processing system 60 utilizes absolute changes in light intensity. It should be noted in particular how the container 41 is rotated 360 degrees within the scanning area of e.g. an omni-directional bar code reader 70 or a set of bar code readers together providing a corresponding functionality. Thereby there is no need to move the scanning field of the bar code reader system 70 by e.g. a mirror in order for the bar code of the container 41 to be scanned. Rotation of the container 41 is carried out without stopping the container and without disturbing the image processing system 60. The container 41 may then be carried further through the recognizing chamber 10, so that it exits at the back of the chamber 10 through the outlet opening, not shown. If the container 41 is not approved, it may be returned through the feed opening 13 by reversing of the conveyor 30.

Alternatively the plate 42 may be formed as an arm or other construction guiding the container 41 through the recognizing chamber 10.

The plate 42 may alternatively be an integrated part of the light plate 50.

The bar code reader system 70 may also be a scanner for other identifiers, such as two-dimensional patterns, text or marks.

What is claimed is:

1. A device in equipment for automatically receiving, scanning and handling containers which are essentially rotationally symmetrical about their longitudinal axes, the equipment being arranged in such a way that the containers are carried and/or rotated in a lying position, by means of a conveyor, through a recognizing chamber past at least two detectors for scanning information about the properties of the container, the scanned information being transferred from there to a control unit, which decides the conveying path downstream and further processing of the container, wherein the conveyor is arranged in such a way that relative to the direction of rotation of the conveyor, the container is forced at an angle against a supporting device, whereby the container is simultaneously carried along and rotated about its own longitudinal axis in a helical movement, and the device is provided with an image processing system comprising a camera which is arranged, in cooperation with backlighting from a light plate, to recognize the appearance of the container, a bar code reader being arranged to read essentially simultaneously a bar code present on the container, the helical motion of the container being such that in one turn of the container a complete bar code will be readable to the bar code reader.

2. The device according to claim 1, wherein the supporting device is formed by a plate which is translucent.

3. The device according to claim 1, wherein the light plate is arranged to form the backlighting and is incorporated as a part of the supporting device.

4. The device according to claim 1 wherein the supporting device is formed by a light transmission rod-shaped body.

5. The device according to claim 1 wherein the bar code reader is formed by an identification scanner arranged to scan patterns, marks or text.

6. The device according to claim 1 wherein the conveyor is formed with at least one conveyor band, roller, belt or strap.

7. The device according to claim 1 wherein a recognizing chamber has a number of detectors arranged thereto, such as a metal detector, weighing scales system and similar, which is arranged to detect necessary data for the purpose of determining the properties of the container.

* * * * *